(12) United States Patent
Ottosson

(10) Patent No.: US 10,372,096 B2
(45) Date of Patent: Aug. 6, 2019

(54) USE OF A LIVE VIDEO STREAM IN A PROCESS CONTROL SYSTEM

(71) Applicant: ABB Schweiz AG, Baden (CH)

(72) Inventor: Torbjörn Ottosson, Västerås (SE)

(73) Assignee: ABB Schweiz AG, Baden (CH)

( * ) Notice: Subject to any disclaimer, the term of this patent is extended or adjusted under 35 U.S.C. 154(b) by 111 days.

(21) Appl. No.: 15/100,599

(22) PCT Filed: Dec. 15, 2014

(86) PCT No.: PCT/EP2014/077671
§ 371 (c)(1),
(2) Date: May 31, 2016

(87) PCT Pub. No.: WO2015/128022
PCT Pub. Date: Sep. 3, 2015

(65) Prior Publication Data
US 2016/0299481 A1 Oct. 13, 2016

(30) Foreign Application Priority Data
Feb. 28, 2014 (EP) .................................... 14157116

(51) Int. Cl.
G05B 19/042 (2006.01)
G05B 19/418 (2006.01)
(Continued)

(52) U.S. Cl.
CPC ....... *G05B 19/042* (2013.01); *G05B 19/4183* (2013.01); *G05B 23/0272* (2013.01);
(Continued)

(58) Field of Classification Search
CPC ...... G05B 19/4183; G05B 2219/23258; G05B 2219/31304; G05B 2219/31472; G05B 2219/35506
See application file for complete search history.

(56) References Cited

U.S. PATENT DOCUMENTS 6,765,569 B2 7/2004 Neumann et al.
7,296,956 B2 11/2007 Dirnfeldner
(Continued)

FOREIGN PATENT DOCUMENTS

DE 102004036104 A1 3/2006
EP 2645335 A1 10/2013
EP 2685421 A1 1/2014

OTHER PUBLICATIONS

European Search Report Application No. 14157116.6 Completed: Jul. 30, 2014;dated Aug. 11, 2014 9 pages.
(Continued)

*Primary Examiner* — Raj R Gupta
(74) *Attorney, Agent, or Firm* — Whitmyer IP Group LLC

(57) ABSTRACT

A method, user interface control arrangement, and a computer program product for controlling a stationary user interface in an industrial process control system as well as to such a process control system. The user interface control arrangement obtains a first live video stream from a video camera monitoring an industrial process at a first location, obtains a process control view for the first location, overlays the process control view on the first live video stream and displays the first live video stream with the overlaid process control view on a display of the user interface.

18 Claims, 4 Drawing Sheets

(51) Int. Cl.
*H04N 7/18* (2006.01)
*G05B 23/02* (2006.01)
*H04N 5/225* (2006.01)

(52) U.S. Cl.
CPC ............. *H04N 5/225* (2013.01); *H04N 7/181* (2013.01); *G05B 2219/23258* (2013.01); *G05B 2219/31304* (2013.01); *G05B 2219/31472* (2013.01); *G05B 2219/31479* (2013.01); *G05B 2219/32011* (2013.01); *G05B 2219/35506* (2013.01); *Y02P 90/10* (2015.11)

(56) References Cited

U.S. PATENT DOCUMENTS

| | | |
|---|---|---|
| 7,787,992 B2 | 8/2010 | Pretlove et al. |
| 8,125,405 B2 | 2/2012 | Dove et al. |
| 2010/0318198 A1 | 12/2010 | Smith et al. |
| 2011/0061591 A1* | 3/2011 | Stecker ................. B22F 3/1055 118/663 |
| 2011/0157357 A1 | 6/2011 | Weisensale et al. |
| 2012/0249588 A1* | 10/2012 | Tison .................... G06F 1/1696 345/633 |
| 2013/0321245 A1 | 12/2013 | Harper |
| 2015/0116498 A1* | 4/2015 | Vartiainen ............ G05B 19/042 348/159 |

OTHER PUBLICATIONS

International Preliminary Report on Patentability Application No. PCT/EP2014/077671 Completed: Jan. 25, 2016 9 pages.

International Search Report and Written Opinion of the International Searching Authority Application No. PCT/EP2014/077671 Completed: Feb. 27, 2015;dated Mar. 6, 2015 12 pages.

* cited by examiner

USE OF A LIVE VIDEO STREAM IN A PROCESS CONTROL SYSTEM

TECHNICAL FIELD

The present invention generally relates to process control systems. More particularly the present invention relates to a method, user interface control arrangement and computer program product for controlling a stationary user interface in an industrial process control system as well as to such a process control system.

BACKGROUND

A process control system normally comprises a number of process control devices involved in the control of the process.

The process control system does then typically comprise control computers as well as operator stations or monitoring computers via which operators can monitor the process. The operator stations are then normally stationary and provided in a control room or a control station in the plant.

At an operator station in a process control system it is common to have a graphical process control view displaying the process or a part of the process, where the process and its devices may be represented as graphical blocks interconnected in a logical structure.

It is also known to have video cameras installed at locations around the process control devices. The cameras capture video images that are streamed to the control room or control station for being observed via the monitoring computers. The operators can then view the video streams on the screens of their monitoring computers. However, in this case the video is typically displayed beside the graphical blocks. The majority of the display area is typically occupied by the graphical process control view.

In some processes the overview is much better in the video stream. This means that in the above-mentioned situation, it is possible that an operator fails to notice important changes of the process because the video is dominated by the process view. It would thus be of interest to get a better overview of the process where a live video stream dominates the user interface display. However, it may still be necessary to see the process view.

It is known to overlay process control graphics on live video in a process control environment. This is described in US 2013/0321245. However, the overlaying is in this document performed in a mobile device. Furthermore it seems as the display of the process control graphics relies on the mobile device being brought out to the location where the video is captured in order to obtain knowledge of the process graphics that are to be combined with the live video. The teachings of this document cannot therefore easily be transferred to an environment where the user interface is stationary.

There is thus a need for allowing a better overview of a process control system at a stationary user interface.

The present invention is provided for solving one or more of the above described problems.

SUMMARY

The present invention addresses the problem of improving process overview of a process at a stationary user interface.

This object is according to a first aspect of the invention solved through a method for controlling a stationary user interface in an industrial process control system, the method being performed by a user interface control arrangement and comprising the steps of:
  obtaining a first live video stream from a video camera monitoring the process at a first location,
  obtaining a process control view for the first location,
  overlaying the process control view on the first live video stream, and
  displaying the first live video stream with the overlaid process control view on a display of the user interface.

This object is according to a second aspect of the invention solved through a interface control arrangement for controlling a stationary user interface in an industrial process control system, the user interface control arrangement comprising:
  a video obtaining unit configured to obtain a first live video stream from
  a video camera monitoring the process at a first location,
  a control graphics unit configured to obtain a process control view for the first location, and
  a user interface control unit configured to overlay the process control view on the first live video stream and display the first live video stream with the overlaid process control view on a display of the user interface.

This object is according to a third aspect of the invention also solved through an industrial process control system for controlling an industrial process and comprising a user interface control arrangement according to the second aspect.

This object is according to a fourth aspect of the invention solved through a computer program product for controlling a stationary user interface in an industrial process control system, the computer program product being provided on a data carrier comprising computer program code configured to cause a user interface control arrangement to, when the computer program code is loaded into at least one device providing the user interface control arrangement,
  obtain a first live video stream from a video camera monitoring the process at a first location,
  obtain a process control view for the first location,
  overlay the process control view on the first live video stream, and
  display the first live video stream with the overlaid process control view on a display of the user interface.

The present invention has a number of advantages. A video stream which in some types of processes best shows the changes in the process forms the foundation of an operator view on a display. This allows the operator to react quickly to important changes that occur in the process. At the same time the relevant process control view is also present and observed. This has the advantage of the operator not having to divert his or her attention from the live video stream in order to look at the process control view, which enhances the security and reliability of control operations.

BRIEF DESCRIPTION OF THE DRAWINGS

The present invention will in the following be described with reference being made to the accompanying drawings, where FIG. 1 schematically shows an industrial plant with a process control system operating an industrial process and comprising a number of video cameras and a user interface device acting as a user interface control arrangement, FIG. 2 schematically shows a block schematic of the user interface device.

DETAILED DESCRIPTION

In the following, a detailed description of preferred embodiments of a method, user interface control arrangement and a computer program product for controlling a stationary user interface in a process control system will be given.

Figure 1:
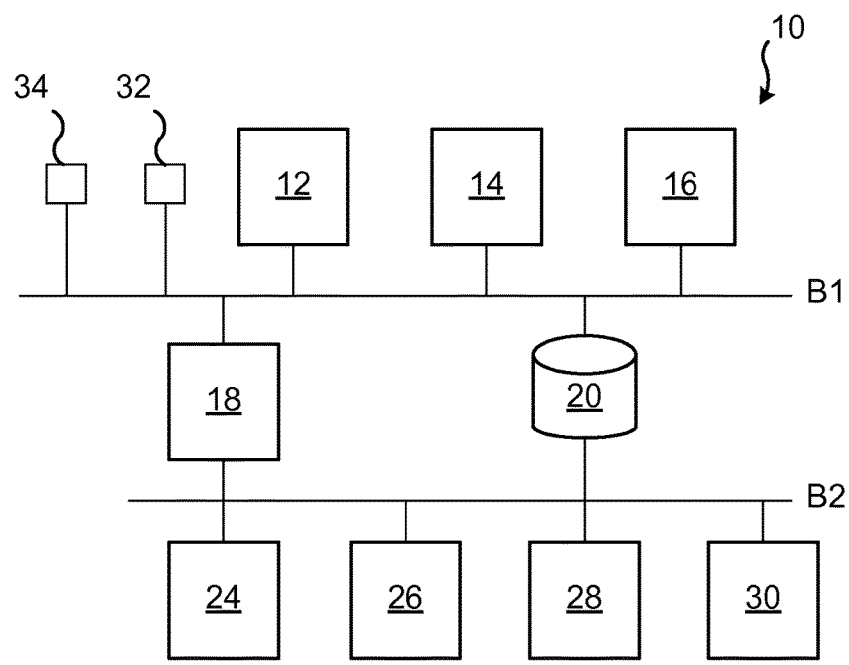

FIG. 1 schematically shows an industrial plant where an industrial process control system 10 is provided. The process control system 10 is a computerized process control system for controlling an industrial process. The process can be any type of industrial process, such as electrical power generation, transmission and distribution processes as well as water purification and distribution processes, oil and gas production and distribution processes, petrochemical, chemical, pharmaceutical and food processes, and pulp and paper production processes. These are just some examples of processes where the system can be applied. There exist countless other industrial processes. The processes may also be other types of industrial processes such as the manufacturing of goods. A process may be monitored through one or more process monitoring computers, which communicate with a server handling monitoring and control of the process.

In FIG. 1 the process control system 10 therefore includes a number of process monitoring computers 12, 14 and 16. These computers may here also be considered to form operator terminals or work stations and are connected to a first data bus B1. These operator terminals are also user interfaces to the operators of the process control system. They are furthermore stationary. One of the process monitoring computers 16 is also a user interface device acting as a user interface control arrangement. It should be realized that the user interface control arrangement is not necessarily limited to implementation in a user interface. It may for instance be implemented through a server connected to the first bus B1, which server controls the display of data via a user interface of a process monitoring computer.

To the first bus B1 there is also connected a first and a second video camera 32 and 34. The video cameras 32 and 34 are provided at a first and a second location in the facilities of the plant where the process is being run. These locations differ from the locations of the user interfaces. The user interfaces are stationary. Some of these user interfaces are provided in a control room, while others may be provided at a dedicated control station in the plant. The control room and control stations, and therefore also the user interfaces, are thus separated from the first and second locations.

There is furthermore a second data bus B2 and between the first and second data busses B1 and B2 there are connected a server 18 providing control and protection of the process and a database 20 where data relating to control and protection of the process is stored. Such data relating to control and protection may here comprise process data such as measurements and control commands, while data relating to protection may comprise alarm and event data as well as data on which alarms and events can be generated, such as measurements made in the process. The database 20 may also comprise graphics related to the process such as graphical symbols representing the process control devices, logical process connection schemes and face plates of process control devices and physical properties of the process control devices.

To the second data bus B2 there is also connected a number of further devices 24, 26, 28 and 30. These further devices 24, 26, 28 and 30 are field devices, which are devices that are interfaces to the process being controlled. A field device is typically an interface via which measurements of the process are being made and to which control commands are given. Because of this the field devices are furthermore process control devices. There is thus a first process control device 24, a second process control device 26, a third process control device 28 and a fourth process control device 30.

Figure 2:
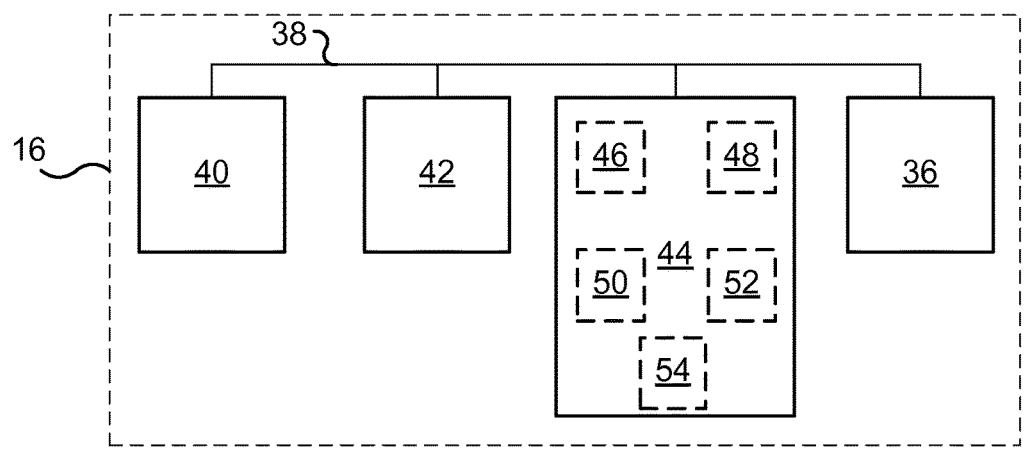

FIG. 2 shows a block schematic of the user interface device 16. The user interface device 16 comprises an internal bus 38 and to this internal bus there is connected a communication interface 40 for connection to the first data bus B1, a processor 42, a program memory 44 as well as a display 36. The communication interface 40 may be an Ethernet communication interface.

In the program memory 44 there is provided software code which when being run by the processor 42 forms a video obtaining unit 46, a control graphics unit 48, a user interface control unit 50, an image recognition unit 52 and an activity determining unit 54.

Figure 3:
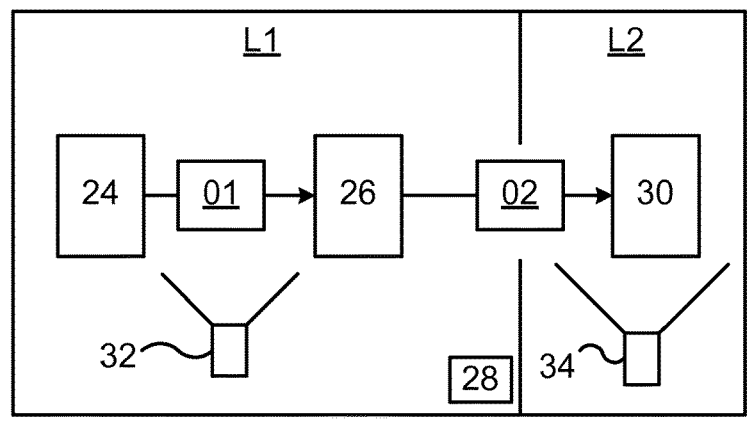
FIG. 3 shows a first and a second location in the premises of the industrial plant, where there are a number of process control devices, objects being produced in the process, and video cameras at the two locations, FIG. 4 schematically shows a live video stream captured by a first of the video cameras, FIG. 5 schematically shows process graphics associated with the first location, FIG. 6 schematically shows the process graphics overlaid on the live video stream, FIG. 7 schematically shows an object with and without a visible activity indicator.

FIG. 3 schematically shows two adjoining locations of the industrial plant. There is a first location L1 and a second location L2. At the first location L1, the first, second and third process control devices 24, 26 and 28 are placed. At the first location L1 also the first video camera 32 is placed or provided for monitoring the process at this first location L1. In this example the first video camera 32 is fixed, i.e. it has a fixed position at the first location L1 and is placed so that when having a first orientation it is able to cover the first and second process control devices 24 and 26, while if it has a second orientation it will be able to cover the third process control device 28. At the first location L1 there is also a first object O1 being provided by the first process control device 24. At the second location L2, the second video camera 34 is located and set to cover the fourth process control device 30. A second object O2 is seen as being supplied from the second process control device 26 to the fourth process control device 30. Furthermore, during the running of the process the object O1 being produced by the first process control device 24 may be moved from the first to the second process control device 26 for some further processing. It may thereafter be moved to the second location L2 for being handled by the fourth process control device 30.

Figure 4:
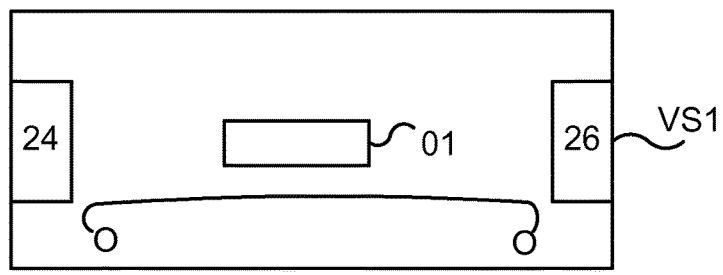
Figure 5:
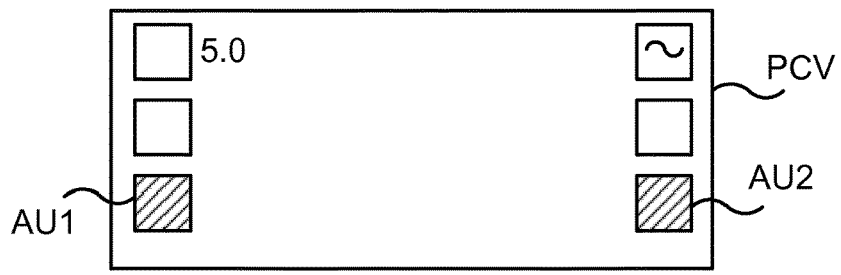
Figure 6:
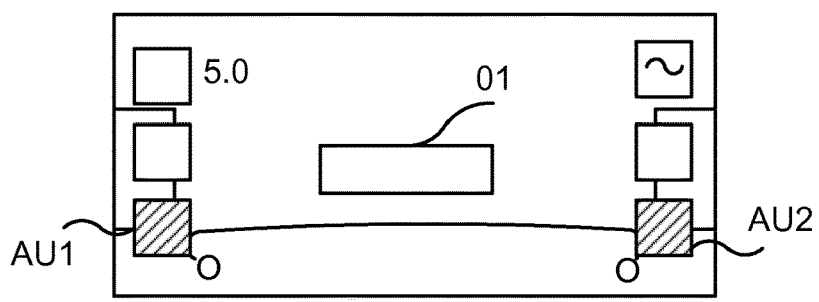
Figure 7:
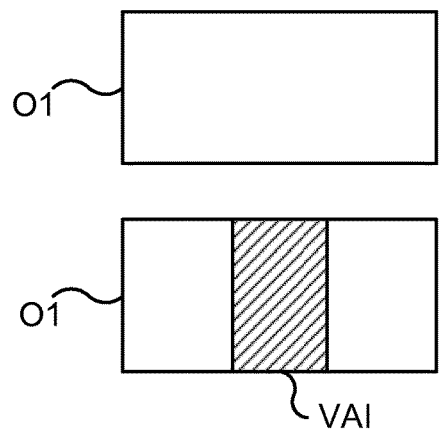
Figure 8:
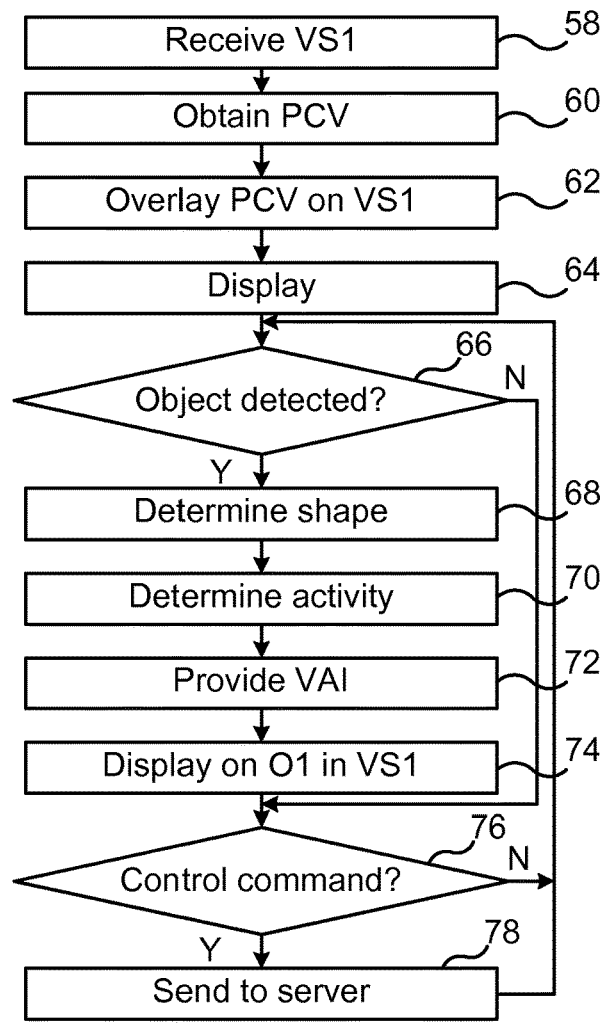
FIG. 8 shows a flow chart of a number of method steps being performed in a method of controlling a user interface, and FIG. 9 schematically shows a data carrier with computer program code, in the form of a CD-ROM disc, for performing the steps of the method.

A first embodiment of the invention will now be described with reference also being made to FIG. 4-8, where FIG. 4 schematically shows a live video stream captured by the first video camera, FIG. 5 schematically shows process graphics associated with the first location L1, FIG. 6 schematically shows the process graphic overlaid on the live video stream, FIG. 7 schematically shows the object with and without a visible activity indicator and FIG. 8 shows a flow chart of a number of method steps being performed in a method of controlling a user interface.

In the exemplifying process there is a production of objects O1 and O2. The process is furthermore monitored by an operator via the interface device 16. In this monitoring the operator may need to act on alarms and trends to perform various operations in the process.

Process operators in the industry need different kind of information to operate their process area in an efficient and safe way, such as the process area at the first location L1. This is mostly solved by using operator interface features of a control system or Human Machine Interface (HMI) panels connected to Programmable Logic Controllers (PLCs). Such interface features are here defined as being process control views. A process control view typically provides information of the process, sometimes in the form of interconnected graphical symbols representing the process control devices, where the interconnection may follow the process flow. In addition to this process control values and trends may be displayed.

However, in certain processes and manufacturing, it is many times very important to also have a real time video picture of the process in order to find out about the status of the process. This may for instance be needed if there is a lack of measurement methods in the part of the process being monitored. Such a video stream is often displayed beside the process control view.

If the control system information of the process control view is of less importance compared to the video pictures, the above described normal Human Machine Interface (HMI) solution is not efficient. Video images may for instance be important to have when the operator does not have a visual contact with a machine in the process control system, which is the case if the operator terminal is stationary and separated from the location where the production takes place.

FIG. 3 shows an example of where this problem may be at hand. In the example of FIG. 3, the first process control device 24 produces a product, which is the object O1, that is then transported to the second process control device 26 for being further processed. The object O1 may have properties that are not easily measured in the system, such as in the first process control device 24. However, these properties may be clearly visible after an optical inspection. For this reason the first video camera 32 is placed at the first location L1 so that the object O1 can be easily observed as it is transported between the first and second process control devices 24 and 26. The first video camera 32 thereby captures video images of the process and in this example video images of the object O1, which video images are conveyed as a first live video stream VS1 to the video obtaining unit 46 of the interface device 16 via the bus B1.

FIG. 4 schematically shows an image captured by the first camera 32 depicting the first object O1 being transported on a transport belt between the first and second process control devices 24 and 26. The video obtaining unit 46 thus obtains or receives the first live video stream VS1, step 58. Furthermore, the control graphics unit 48 obtains a process control view PCV, step 60. This process control view PCV is a process control view for the first location L1 and comprises graphical symbols related to the process control devices of the first location L1 that can be seen by the first video camera 32. The graphical symbols may comprise a graphical symbol representing a physical property associated with a process control device or with the process at the process control device, a graphical symbol representing the process control device itself, a graphical symbol representing process control data trends of a process control device and a possible control command.

FIG. 5 shows a few such symbols together with process control data. On the left hand side of FIG. 5, there is shown next a symbol of a property in relation to the first process control device 24 together with a value 5.0 of this property, which value is a process control data value, a symbol representing the first process control device and a symbol representing a first actuating unit AU1 also related to the first process control device 24. On the right side of the figure there is shown a symbol representing trends of the second process control device 26, which symbol is a face plate and therefore also comprises such trend data, a symbol representing the second process control device 26 itself as well as a symbol representing a second actuating unit AU2 associated with the second process control device 26. The graphical symbols may for instance comprise icons obtained from a graphical symbol library in the database 20, while the process control data may be obtained from the server 18, which in turn may have collected it from the process control devices themselves. The actuating units AU1 and AU2 are process actuators that may be actuated or maneuvered by the operator in order to perform control activities in the process.

In some variations the first video camera 32 has a fixed view, i.e. the area it covers and the part of the process control system that can be seen by it at the first location L1 is fixed. It may for instance have the first orientation. Furthermore, the graphical symbols used may also be stored locally in the interface device 16 and need not be fetched from the database 20. However, process control data will be needed to be fetched from the server 18.

After the video stream VS1 and the process control view PCV have been obtained these are then forwarded from the video obtaining unit 46 and the control graphics unit 48 to the user interface control unit 50. This unit 50 then overlays the process control view PCV on the first live video stream VS1, step 62, and then displays the video stream VS1 with overlaid process control view PCV on the display 36 of the user interface device 16, step 64. The combination of video stream and process control view is schematically shown in FIG. 6.

In this way an intelligent process control graphic view overlaid on a live video stream is provided as operator interface. The overlay furthermore comprises the information normally presented through control system HMIs, like alarms, process data, trends etc.

The display 36 may be a touch screen, in which case it forms a user interface where it is possible for the operator to directly actuate the first and second actuating units AU1 and AU2 via the display 36 and the touch of a finger. Alternatively a separate user input unit such as a keyboard, mouse or trackball may be used.

The video stream VS1 that best shows the changes in the process thus forms the foundation of the operator view on the display 36, which allows the operator to react quickly on important changes that occur in the process. At the same time the relevant process control view is also present and observed. Furthermore the operator can directly perform operations on the combination of video stream and process control view. This has the advantage of the operator not having to divert his or her attention from the live video stream in order to look at the process control view or to perform control activities, which enhances the security and reliability of control operations.

Furthermore, in this first embodiment, it is possible to make some further investigations of the video stream in order to enhance the control further. This is done through the use of the image recognition unit 52. The image recognition unit 52 may be provided with augmented reality (AR) functionality.

A 3D map of natural features at the location L1 can be built using a variety of feature extraction methods such as corner or edge detection both with 2D RGB data and 3D RGBD (Red, Green, Blue, Depth) data. Using this sparse map it is also possible to determine if an object being processed that leaves the first process control device 24 can be detected in the live video stream VS1 and more particularly the shape of such an object.

Therefore the user interface control unit 50 may interrogate the image recognition unit 52 about if an object being processed is detected leaving the first process control device 24. If the answer is negative, step 66, then the user interface process control unit 50 proceeds and investigates if there is any input via an actuating unit, such as AU1 or AU2. However, if the image recognition unit 52 did detect an object being processed in the first video stream VS1, step 66, the shape of the object is then determined in the same unit 52, step 68. The image recognition unit 52 may thus detect the shape, for instance the 3D shape, of the object using image recognition, for instance in the form of the above-described AR functions. The image recognition unit 52 then forwards data about the shape to the activity determining unit 54, which data may define a 3D image of the shape.

The activity determining unit 54 then determines an activity to be performed in the process based on the determined shape, step 70. The shape of the object may for instance be compared with a reference shape or ideal shape and an activity may be determined based on the difference. The activity may be a change in relation to a process control device, for instance an activity upstream in the process flow from where the object is detected, such as a change in a setting to be made to the first process control device 24. The activity may also be an activity downstream in the process flow such as in the second process control device 26. The activity determining unit 54 may in such cases provide an automatic control command and supply it to the server 18 for making the adjustment of the process control device in question. The activity may also or alternatively be an activity to be performed on the object O1. In this case it is also possible that the activity determining unit 54 provides a visual activity indicator VAI, step 72, i.e. a visual indication of the type of activity that is to be performed on the object O1. This visual activity indicator may then be linked to the identified object. The activity may thus be a unique activity that is to be performed on the object, the shape of which was identified. The indicator may thus be an indication of an activity that is individual for each object being detected or an activity that is dedicated to the identified object.

The indicator VAI may then be sent to the user interface control unit 50 which makes the indicator VAI follow the object O1 in the video stream VS1. It may thus be overlaid and displayed on the object O1 in the first live video stream VS1 in order to allow the activity to be performed, step 74. The indicator VAI may thus be made to follow the object O1 as it moves in the video stream VS1. The visual activity indicator VAI may more particularly be an indicator that is linked to the geometry of the object, such as an indicator indicating areas of the object where material is to be removed or added. An object O1 with and without an indicator VAI is shown in FIG. 7. In this figure there is an indication that the object is to be thinner at the middle. The visual activity indicator VAI may indicate the same type of activity to be performed on the different objects, where the degree with which the activity is to be performed on the different objects depends on their individual shapes.

Such an indication VAI may then be useful in assisting the operator in the performing of the activity at the second process control device 26, and the operator may then better define how much of the activity and where on the object the activity is to be performed. As an example the visual activity indicator VAI may be a cutting pattern, indicating where the object is to be cut, a general position indicator, a borderline etc.

The user interface control unit 50 then investigates if there is a user input in the form of a control command via a user input unit such as via an actuating unit AU1 and AU2 of the display 36. This investigation may be carried out in both cases, with or without object identification and accompanying activity indicator. If there is no control command, step 76, then the user interface control unit 50 returns and investigates if an object is detected, while if a control command is detected, step 76, which may be done with either the first or the second actuator unit AU1 and AU2 on the display 36, a corresponding control command is sent to a control device in the system, such as the server 18, for allowing this device to control the process based on the control command, step 78. Thereafter the user interface control unit 50 returns and investigates if an object is detected.

The use of visual activity indicator gives the operator further assistance in the control of the process without having to use other means for determining the control activity. Such other means may also be hard to implement in a process.

The above described first embodiment may be varied in a multitude of ways. It is for instance possible that the visual activity indicator VAI is not concerned with activities to be performed by the second process control device 26. It may be related to activities that are to be performed on the first object O1 in relation to the fourth process control device 30 at the second location L2, i.e. at a location that is not covered by the first video camera 32 but by the second video camera 34. In this case the second video camera 34 captures video images of the second location L2 that are delivered to a user interface, which may be provided via the display 36 of the user interface device 16, but may also be via a display of any of the other user terminals 12 and 14. The interface control unit 50 may therefore export the visual activity indicator VAI for display on the object when present in the second live video stream obtained at the second location L2. It is thus possible to make the visible activity indicator VAI follow the object as it travels or moves to another location, in this example the second location L2, covered by another video camera than the one for which the object was identified.

Another variation that is possible concerns the first video camera 32. The first video camera 32 may be able to change the area that it covers. This change may involve rotating the camera. The video camera 32 may thus have an adjustable angle of rotation. It may additionally or instead be able to zoom. It may therefore also have an adjustable viewing angle, where a zooming out involves a decrease of the viewing angle and a zooming in involves an increase of the viewing angle. It is in both these cases possible that the graphical objects shown in the process control view PCV are dependent on the process control devices actually being covered by the first video camera 32. This means that the control graphics unit 48 may receive information of the rotational and/or viewing angle covered by the first video camera 32 in order to determine the area covered by the first video camera 32 and thereafter determine a process control view that corresponds to the covered area. The determining of process control view may involve determining which process control devices are covered by the camera 32 and then only include graphical objects and process control data related to process control devices covered by the camera 32 in the process control view. The process control devices in question may easily be determined since the positions of both the camera and process control devices are known. An angle of rotation and a viewing angle may then directly be used in order to immediately locate the process control devices that can be seen and for which graphical objects are to be displayed.

The way this is done may be exemplified in relation to the third process control device 28. As can be seen in FIG. 3, the first video camera 32 may initially have the first orientation where it covers the first and second process control devices 24 and 26. The first video camera 32 may then be set to rotate and/or zoom so that it has the second orientation where it covers the third process control device 28. In this case it will no longer be able to cover the first and second process control devices 24 and 26. In this case the process control view provided by the control graphics unit 48 will only comprise graphical symbols and process control data associated with the third process control device 28 and not with the first and second process control devices 24 and 26.

There are a number of further variations that are possible to make. For instance, the graphical symbols were above described as being provided in the database. However, it should be realized that they may be placed in the interface device instead. This may be the case both when having a fixed orientation and when being able to change orientation of the first video camera.

It should furthermore be realized that the detection of the object and consequently also the provision of the visual activity indicator may be omitted from the first embodiment.

Figure 9:
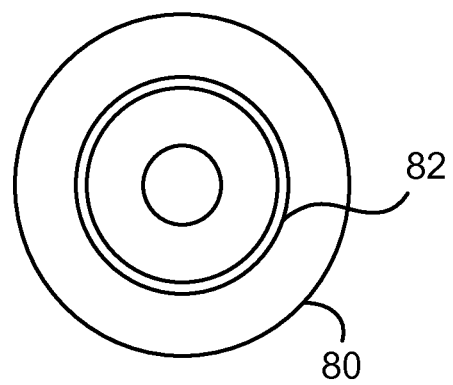

The functionality of the interface device may furthermore both be provided in the form of one or more processors together with computer program memory including computer program code for performing their functions. As an alternative they may be provided in the form of an Application Specific Integrated Circuit (ASIC) or Field-Programmable Gate Array (FPGA). This computer program code may also be provided on one or more data carriers which perform the functionality of the present invention when the program code thereon is being loaded into an interface device. One such data carrier 80 with computer program code 82, in the form of a CD ROM disc, is schematically shown in FIG. 9. Such computer program may as an alternative be provided on another server and downloaded therefrom into the interface device.

The invention can be varied in many ways. The interface arrangement, which may comprise the above-mentioned interface device or a server which interacts with the display of a user interface, may for instance comprise one or more of the video cameras. It can therefore be seen that the present invention is only to be limited by the following claims.

The invention claimed is:

1. A method for controlling a stationary user interface in an industrial process control system, the method being performed by a user interface control arrangement and comprising the steps of:

obtaining a first live video stream from a video camera monitoring an industrial process at a first location, where the industrial process comprises production of objects, obtaining a process control view for the first location, the process control view comprising at least one icon representing at least one process actuator, overlaying the process control view on the first live video stream, displaying the first live video stream with the overlaid process control view on a display of the user interface, detecting, in the first live video stream, an object being processed, determining the shape of the object using image recognition, comparing the shape of the object with a reference shape, determining an activity to be performed in the industrial process based on the difference between the shape of the object and the reference shape, providing a visual indication of the activity, which activity is an activity to be performed on the object, displaying the visual indication on the object in the first live video stream in order to assist the activity to be performed, detecting, via the user interface control arrangement, a control command from an operator, and sending the control command to a control device of the process control system for controlling the industrial process based on the control command, where the control command concerns the activity to be performed on the object.

2. The method according to claim 1, wherein the object is moving to a second location and exporting the visual indication for display on the object when present in a second live video stream obtained at the second location.

3. The method according to claim 1, wherein the visual indication is an indicator indicating one or more areas of the object where material is to be removed or added.

4. The method according to claim 1, wherein the video camera has a fixed position at the first location and the area covered by the video camera is changeable and further comprising determining the area covered by the video camera and determining a process control view corresponding to the covered area, where the process control view that is displayed overlaid on the first live video stream is the determined process control view.

5. The method according to claim 4, wherein the video camera has an adjustable angle of rotation and the determination of the process control view is based on the angle of rotation of the video camera.

6. The method according to claim 4, wherein the video camera has an adjustable viewing angle and the determination of the process control view is based on the viewing angle of the video camera.

7. The method according to claim 1, further comprising obtaining process control data from process control devices at the first location and displaying the process control data in the process control view overlaid on the first live video stream.

8. A user interface control arrangement for controlling a stationary user interface in an industrial process control system, the user interface control arrangement comprising:

a video obtaining unit configured to obtain a first live video stream from a video camera monitoring an industrial process at a first location, where the industrial process comprises production of objects, a control graphics unit configured to obtain a process control view for the first location, the process control view comprises at least one icon representing at least one process actuator, an image recognition unit configured to detect, in the first live video stream, an object being processed and determine the shape of the object, an activity determining unit configured to compare the shape of the object with a reference shape and determine an activity to be performed in the industrial process based on the difference between the shape of the object and the reference shape and provide a visual indication of the activity, which is an activity to be performed on the object, and a user interface control unit configured to overlay the process control view on the first live video stream, display the first live video stream with the overlaid process control view on a display of the user interface, display the visual indication on the object in the first live video stream in order to assist the activity to be performed, detect a control command from an operator and send the control command to a control device of the process control system for controlling the process based on the control command, where the control command concerns the activity to be performed on the object.

9. The user interface control arrangement according to claim 8, wherein the object is moving to a second location and the user interface control unit is configured to export the indication for display on the object when present in a second live video stream obtained at the second location.

10. The user interface control arrangement according to claim 8, wherein the visual indication is an indicator indicating one or more areas of the object where material is to be removed or added.

11. The user interface control arrangement according to claim 8, wherein the video camera has a fixed position at the first location, the area covered by the video camera is changeable, the control graphics unit is further configured to determine the area covered by the video camera and determine a process control view corresponding to the covered area and the user interface control unit is further configured to display the determined process control view when displaying the process control view overlaid on the first live video stream.

12. The user interface control arrangement according to claim 11, wherein the video camera has an adjustable angle of rotation and the user interface control unit is configured to base the determination of the process control view on the angle of rotation of the video camera.

13. The user interface control arrangement according to claim 11, wherein the video camera has an adjustable viewing angle and the user interface control unit is configured to base the determination of the process control view on the viewing angle of the video camera.

14. The user interface control arrangement according to claim 8, wherein the control graphics unit is configured to obtain process control data from process control devices at the first location and the user interface control unit is configured to display the process control data in the process control view overlaid on the first live video stream.

15. The user interface control arrangement according to claim 8, further comprising the user interface.

16. The user interface control arrangement according to claim 8, further comprising the video camera.

17. An industrial process control system for controlling an industrial process and comprising a user interface control arrangement having:

a video obtaining unit configured to obtain a first live video stream from a video camera monitoring an industrial process at a first location, where the industrial process comprises production of objects, a control graphics unit configured to obtain a process control view for the first location, the process control view comprises at least one icon representing at least one process actuator, an image recognition unit configured to detect, in the first live video stream, an object being processed and determine the shape of the object, an activity determining unit configured to compare the shape of the object with a reference shape and determine an activity to be performed in the industrial process based on the difference between the shape of the object and the reference shape and provide a visual indication of the activity, which is an activity to be performed on the object, and a user interface control unit configured to overlay the process control view on the first live video stream, display the first live video stream with the overlaid process control view on a display of the user interface, display the visual indication on the object in the first live video stream in order to assist the activity to be performed, detect a control command from an operator and send the control command to a control device of the process control system for controlling the process based on the control command, where the control command concerns the activity to be performed on the object.

18. A computer program product for controlling a stationary user interface in an industrial process control system, said computer program product being provided on a data carrier comprising computer program code configured to cause a user interface control arrangement to, when said computer program code is loaded into at least one device providing the user interface control arrangement, obtain a first live video stream from a video camera monitoring an industrial process at a first location, where the industrial process comprises production of objects, obtain a process control view for the first location, the process control view comprising at least one icon representing at least one process actuator, overlay the process control view on the first live video stream, display the first live video stream with the overlaid process control view on a display of the user interface, detect, in the first live video stream, an object being processed, determine the shape of the object using image recognition, compare the shape of the object with a reference shape, determine an activity to be performed in the industrial process based on the difference between the shape of the object and the reference shape, provide a visual indication of the activity, which activity is an activity to be performed on the object, display the visual indication on the object in the first live video stream in order to assist the activity to be performed, detect, via the user interface control arrangement, a control command from an operator, and send the control command to a control device of the process control system for controlling the industrial process based on the control command, where the control command concerns the activity to be performed on the object.

\* \* \* \* \*